May 20, 1947.  C. PETERSEN  2,420,973
CULTIVATOR PLOW
Filed Jan. 26, 1944

Inventor
Christian Petersen
By
Attorney

Patented May 20, 1947

2,420,973

UNITED STATES PATENT OFFICE 2,420,973

CULTIVATOR PLOW

Christian Petersen, South Windsor, Conn.

Application January 26, 1944, Serial No. 519,706

3 Claims. (Cl. 97—54)

This invention relates to improvements in a cultivator plow and more particularly, though not restrictively, to disc-type cultivator plows used for either light plowing or cultivating purposes.

The invention primarily relates to a cultivator unit of which a plurality of similar units may be mounted in gang relationship in a plow or cultivator assembly.

In conventional cultivators of both the disc and tooth type, it is generally customary to mount the cultivator discs or teeth substantially rigidly with respect to the bar or frame which supports them. Some improved types of cultivators are provided with pivotally mounted cultivator teeth, for example, which will automatically pivot rearward about a short radius to free themselves of obstructions when encountered while moving through soil. After the obstruction is cleared, however, the pivoted teeth are automatically restored to their normal position in which they remain during their normal operation without being adjustable vertically with respect to their supporting frame.

In the average cultivated field, the majority of the area of the field will usually be of a substantially even contour having a mean level. However, in the field there will be many relatively small localized areas of varying sizes which have levels that are higher or lower than the mean level of the field. Also, in stony or rocky soil, the encountering of stones or rocks by cultivator or plow units or members will usually cause a momentary raising of the entire cultivator assembly from the soil until said stone or rock is cleared by the particular cultivator or plow member encountering the same. On other occasions, a stone or rock will be dragged along by a particular cultivator or plow member and improper cultivation by said member results.

It is an object of the present invention to provide a plow or cultivator unit which will not only automatically clear itself from stones, rocks, and other obstructions in a field, but will also automatically enter the soil being plowed or cultivated to a substantially uniform depth regardless of whether the particular localized area of the soil momentarily encountered by any individual cultivator or plow unit is of the mean level of the field, a higher level, or a lower level.

It is another object of the invention to construct said plow or cultivator units whereby they may be readily mounted on a common support in gang relationship and independently function so that a relatively wide area of soil will be simultaneously plowed or cultivated to a substantially uniform depth by all of said units in the gang.

It is a further object of the invention to so construct said plow or cultivator units that they will function as described above regardless of whether said units are mounted on a cultivator or plow assembly that is supported by wheels or is supported by the plow or cultivator units per se without the aid of any other supporting means.

Other objects of the invention as well as details of the foregoing objects and details of the construction comprising the invention are set forth in the following specification and illustrated in the accompanying drawings comprising a part thereof.

The accompanying drawings show the embodiment of the invention which is deemed preferable, but it will be understood that the drawings are intended for illustrative purposes only and are not to be construed as defining or limiting the scope of the invention, the claims forming a part of this specification being relied upon for that purpose.

Figure 1:
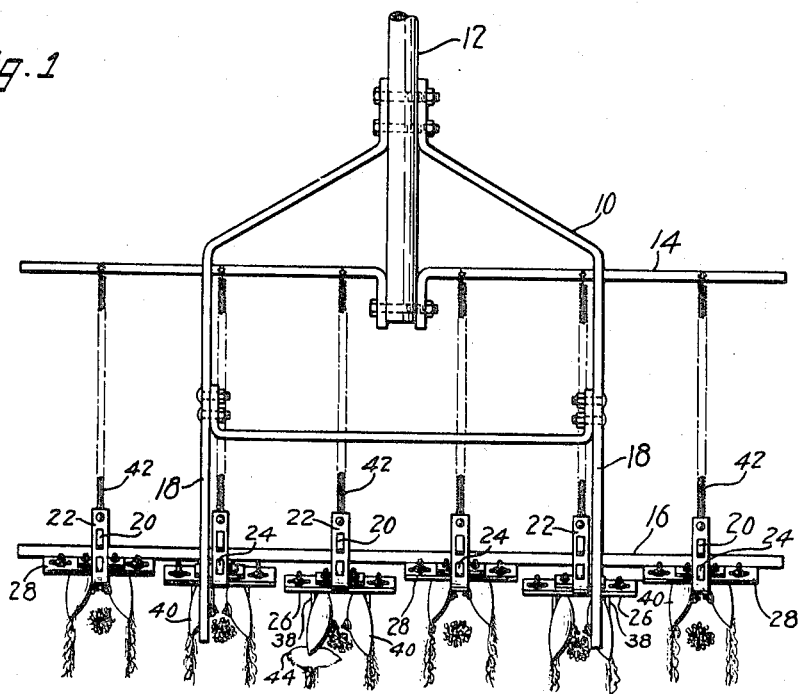
Fig. 1 is a partly fragmentary top plan view of a plow or cultivator assembly comprising the present invention, the cultivator units mounted in gang relationship being disposed at various elevations in accordance with the levels of the localized soil areas respectively engaged by said units.

Referring to the drawings, a portable frame 10 is provided with a tongue 12 adapted to be attached to a tractor or be hitched to horses for purposes of moving the frame over a field. The frame 10 comprises a pair of spaced horizontal bars 14 and 16 which are held in spaced relationship by a pair of side members 18 comprising part of the frame 10.

A variable number of plow or cultivator units may be adjustably secured to the bar 16 and said units may be spaced thereon in accordance with the spacing of the rows of plants to be cultivated by the individual units or in accordance with the spacing of the furrows to be plowed by the individual units when they are used for plowing purposes.

Each of the plow or cultivator units comprises a substantially vertical standard 20 which is adjustably secured to the bar 16 by a yoke 22 having openings in the arms thereof to receive the standard 20. Additional openings are also provided in the yoke for purposes of receiving a wedge 24 which is driven into frictional engagement against the side of the bar 16 opposite that engaged by the standard 20, whereby when the wedge 24 is tight, the standard will remain in fixed adjusted position with respect to the bar 16.

Pivotally secured to the lower end of each standard 20 is a bracket 26 comprising a horizontal plate 28 to which are secured a pair of angles 30. The angles may be suitably secured to the plate 28 by welding, bolts, or any other appropriate means. The vertical legs of the angles 30 comprise leg means of the bracket and are spaced apart a sufficient distance to freely receive the lower end of one of the standards 20. Said angles and standard are provided with aligned openings to accommodate a pivot bolt 32 by which the bracket 26 is secured to the standard 20.

The angles 30 are also provided with a pair of additional aligned openings adapted to receive a pin or bolt 34 which secures a stop member 36 transversely between the vertical legs of angles 30. The stop 36 is so positioned that the bracket 26 may not pivot forward and downward, as viewed in Fig. 3, farther than the position of unit A shown in Fig. 3. It will thus be seen that, even when the bracket is in its lowermost position, the lower end of said bracket still extends rearward of the lower end of the standard 20.

It is to be understood that the direction rearward is to be considered with respect to the direction in which the cultivator is moved through the soil, the latter direction being considered forward.

The plate 28 of bracket 26 is adapted to preferably support a pair of angular legs 38 which respectively directly rotatably support the plow or cultivator members per se. In the instant drawings, said plow or cultivator members have been indicated as conventional dished plow or cultivator discs 40. While this represents the preferred construction, said illustration is not to be considered as restricting the broad principles of the invention.

The angular legs 38 are preferably adjustably mounted on the plate 28 of bracket 26, whereby the dished discs 40 may be respectively adjusted in either spaced or angular relationship with respect to each other in order to best adapt the discs to any particular type of plowing or cultivation which may be desired. The angular legs are secured to the plate 28 by suitable bolts which pass through holes and/or slots formed in the upper angular portions of legs 38 and plate 28.

A yieldable means 42, preferably but not restrictively comprising a coil spring, is secured at one end to bar 14 and at the other end to plate 28 of the bracket 26 at a position preferably midway of the ends of said plate. Yieldable means 42 will resist the upward and rearward movement of bracket 26 and discs 40 and the spring preferably comprising said yieldable means is of such strength that when the cultivator discs are moving through soil of substantially the mean level of the field, the bracket and discs secured thereto will operate substantially in the position of unit B illustrated in Fig. 3 and in which said bracket extends rearward and downward at an angle of approximately 45° from the horizontal. However, when a localized area of lower level is encountered by the discs of a particular unit, the bracket and discs are automatically moved by the yieldable means 42 forward and downward toward or to the lower position occupied by unit A in Fig. 3. When a localized area of higher level, or an obstruction such as a stone 44, is encountered by one of the disc units, the yieldable means 42 will yield to permit the bracket and discs to move rearward and upward to an exemplary position occupied by unit C in Fig. 3.

Figure 2:
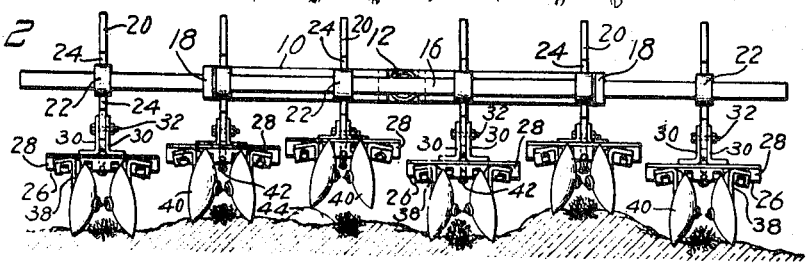
Fig. 2 is a rear end elevation of the construction shown in Fig. 1 and illustrating the manner in which the respective plow or cultivator units automatically assume the level of the localized soil areas respectively engaged by said units whereby all of the areas of a field may be plowed or cultivated to a substantially uniform depth.
Figure 3:
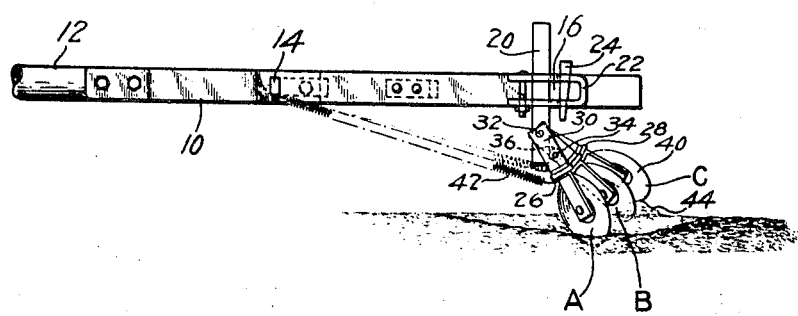
Fig. 3 is a partially fragmentary side elevation of the construction shown in Figs. 1 and 2 and illustrating three different exemplary positions of elevation which the plow or cultivator units assume in accordance with the level of the localized soil areas respectively engaged thereby.

It will be readily noted from Figs. 2 and 3 that each bracket 26 has leg means, comprising the vertical legs of angles 30, projecting therefrom and the upper ends of the leg means are respectively pivoted to each standard 20. Projecting oppositely from each bracket but parallel to the leg means thereof is a plurality of spaced means respectively comprising the supporting means for the disc plows 40. The distance between the plow pivots on the spaced means and the pivots on the leg means is preferably slightly greater than the diameter of the plows. Since said brackets extend rearward and downward during operation along a line extending usually about 45 degrees below a horizontal line and between the pivots of the spaced means and leg means, it will thus be seen that during use, the brackets and plows are capable of moving through substantial angles and even relatively small angular movement produces proportionately great movement of the plows in a vertical direction or component of the angle.

It is to be understood that all of the positions occupied by units A, B and C illustrated in Fig. 3 are merely exemplary. The disc units may assume positions intermediately of the illustrated positions, all in accordance with the particular level of the localized area momentarily engaged by an individual unit. The important feature is that the respective yieldable means 42 which are each connected to an individual disc unit will at all times automatically maintain the individual units in such position with respect to the soil areas momentarily engaged thereby that said individual units will cultivate or plow the soil areas of various levels in a field to substantially a uniform depth below the surface of the soil in all particular areas of the field. Furthermore, should obstructions such as rocks and stones be encountered by any particular unit, said unit will readily and quickly clear itself of said rock or stone and immediately reenter the soil to the proper depth.

It is also to be understood that the units will function in the manner indicated in the foregoing regardless of whether or not the frame 10 and bars 14 and 16 are supported directly upon a plurality of the plow or cultivator units or whether said frame and bars are otherwise supported on suitable wheels mounted on an axle or axles connected to said frame. In the latter event, the yieldable means 42 connected to each disc unit will serve to cause the individual unit to enter all areas of soil engaged thereby to a substantially uniform depth regardless of whether localized areas of said soil are of the mean level of the field, a lower level, or a higher level. Also, when the frame is supported directly by the cultivator or plow units alone, the springs comprising yieldable means 42 should preferably be stronger than the springs used when the frame is supported by additional wheels.

In effect, the instant invention comprises a plow or cultivator construction which is automatically self-adjusting so as to adapt all plow or cultivator units comprising the construction to automatically follow the contour of a field and uniformly plow or cultivate the total area thereof to a substantially uniform depth.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim:

1. A plow mechanism comprising in combination; a supporting frame; a plurality of plow assemblies respectively mounted on said frame for relatively independent movement in accordance with the contour of the soil and each comprising a substantially vertical standard secured to said frame, a bracket having leg means projecting therefrom and pivoted adjacent the outer end thereof to said standard, each bracket also having a plurality of spaced means projecting therefrom oppositely but substantially parallel to said leg means, and similar disc plows respectively pivotally supported on the outer end of each of said spaced means, the distance between the pivots of each plow and leg means being slightly greater than the diameter of said plows and during operation said bracket extending rearward and downward along a line between said pivots of said leg means and plows, whereby said bracket and plows during use may move through substantial angles about the pivot of said leg means thereof and relatively small angular movement produces proportionately great movement of said plows in a vertical direction; and spring means respectively connected to said frame and each bracket, said spring means biasing each bracket forward and downward.

2. A plow mechanism comprising in combination; a supporting frame; a plurality of plow assemblies respectively mounted on said frame for relatively independent movement in accordance with the contour of the soil and each comprising a substantially vertical standard secured to said frame, a bracket having leg means projecting therefrom and pivoted adjacent the outer end thereof to said standard, said bracket also having a plurality of spaced means adjustably connected thereto by means including slots arranged to permit variable spacing of said spaced means and different angular arrangements thereof and said spaced means also projecting from said bracket oppositely but substantially parallel to said leg means, and similar disc plows respectively pivotally supported on the outer end of each of said spaced means, the distance between the pivots of each plow and leg means being slightly greater than the diameter of said plows and during operation said bracket extending rearward and downward along a line between said pivots of said leg means and plows, whereby said bracket and plows during use may move through substantial angles about the pivot of said leg means thereof and relatively small angular movement produces proportionately great movement of said plows in a vertical direction; and spring means respectively connected to said frame and each bracket, said spring means biasing each bracket forward and downward.

3. A plow mechanism comprising in combination; a supporting frame; a plurality of plow assemblies respectively mounted on said frame for relatively independent movement in accordance with the contour of the soil and each comprising a substantially vertical standard secured to said frame, a bracket having leg means projecting therefrom and pivoted adjacent the outer end thereof to said standard, said bracket also having a plurality of spaced means projecting therefrom oppositely but substantially parallel to said leg means, and similar disc plows respectively pivotally supported on the outer end of each of said spaced means, the distance between the pivots of each plow and leg means being slightly greater than the diameter of said plows and during operation said bracket extending rearward and downward along a line between said pivots of said leg means and plows, whereby said bracket and plows during use may move through substantial angles about the pivot of said leg means thereof and relatively small angular movement produces proportionately great movement of said plows in a vertical direction; spring means respectively connected to said frame and each bracket, said spring means biasing each bracket forward and downward; and stop means on said brackets respectively engageable with each standard therefor to limit the forward and downward movement of said brackets.

CHRISTIAN PETERSEN.

REFERENCES CITED

The following references are of record in the file of this patent:

UNITED STATES PATENTS

| Number | Name | Date |
|---|---|---|
| 243,705 | Jefferson | July 5, 1881 |
| 642,273 | White | Jan. 30, 1900 |
| 1,528,181 | Bellinghausen | Mar. 3, 1925 |

FOREIGN PATENTS

| Number | Country | Date |
|---|---|---|
| 534,210 | France | Jan. 3, 1922 |
| 804,991 | France | Aug. 17, 1936 |